United States Patent

Zachrai

[11] Patent Number: 6,026,752
[45] Date of Patent: Feb. 22, 2000

[54] OPERATIVE PLATE FOR A SWITCH CUBICLE

[75] Inventor: Jürgen Zachrai, Dillenburg, Germany

[73] Assignee: Rittal-Werk Rudolf Loh GmbH & Co. KG, Herborn, Germany

[21] Appl. No.: 09/171,372
[22] PCT Filed: Apr. 10, 1997
[86] PCT No.: PCT/EP97/01769
 § 371 Date: Oct. 16, 1998
 § 102(e) Date: Oct. 16, 1998
[87] PCT Pub. No.: WO97/40562
 PCT Pub. Date: Oct. 30, 1997

[30] Foreign Application Priority Data

Apr. 19, 1996 [DE] Germany .......................... 196 15 431

[51] Int. Cl.[7] .................................................. A47B 3/00
[52] U.S. Cl. ............................................. 108/40; 100/42
[58] Field of Search .............................. 108/42, 47, 48, 108/40, 38, 152

[56] References Cited

U.S. PATENT DOCUMENTS

| | | | |
|---|---|---|---|
| 1,553,821 | 9/1925 | Johnson | 108/40 X |
| 1,613,838 | 1/1927 | Lindeken | 108/40 X |
| 1,790,468 | 1/1931 | Frank et al. | 108/40 X |
| 2,993,603 | 7/1961 | Fohn | 108/42 X |
| 3,062,544 | 11/1962 | Viets | 108/40 X |
| 4,791,873 | 12/1988 | Towfigh . | |
| 5,381,738 | 1/1995 | Meyer . | |
| 5,408,936 | 4/1995 | Tseng . | |
| 5,411,192 | 5/1995 | Xiao | 108/42 X |
| 5,655,459 | 8/1997 | O'Connor et al. | 108/48 |
| 5,775,655 | 7/1998 | Schmeets | 108/42 X |

FOREIGN PATENT DOCUMENTS

| | | | |
|---|---|---|---|
| 807394 | 7/1949 | Germany | 108/40 |
| 2530603 | 1/1977 | Germany . | |
| 3638454 | 5/1987 | Germany . | |
| 4121660 | 1/1993 | Germany . | |
| 4312816 | 10/1994 | Germany . | |
| 2135867 | 9/1984 | United Kingdom | 108/42 |

*Primary Examiner*—Jose V. Chen
*Attorney, Agent, or Firm*—Pauley Petersen Kinne & Fejer

[57] ABSTRACT

An operative plate fitted to a wall or a door of a switch cubicle which can be moved from a parallel storage position to a folded-down working position. The operative plate is accessible from three sides in the operative position owing to its special linkage to the wall or door and control by specially articulated arms.

16 Claims, 3 Drawing Sheets

OPERATIVE PLATE FOR A SWITCH CUBICLE

BACKGROUND OF THE INVENTION

1. Field of the Invention

This invention relates to a work surface attached to a wall element or a door of a switchgear cabinet, which can be brought from a parallel stowed position into a flipped-down work position.

2. Description of Prior Art

The known work surfaces of this type are attached like leaves to a wall element or a door of a switchgear cabinet. Here, the lower horizontal side of the work surface is hinged on the wall element or the door by a hinge or the like. The vertical sides of the working surface are connected by leaf holders, known per se, with the wall element or the door. As shown in German Patent Reference DE 43 12 816 A1, the leaf holders have two guide rods, which are hingedly connected with each other, and whose free ends are hinged to the work surface, or respectively the wall element or the door. In the extended position of the two guide rods, the leaf holders determine the work position of the work surface, while in the stowed position they are pivoted on each other. In the work position of the work surface the leaf holders extend over at least a portion of the two sides of the work surface and therefore more or less hamper working on the work surface.

A switchgear cabinet with a circuit diagram pocket is shown in German Patent Reference DE 36 38 454 A1. The circuit diagram pocket can be pivoted into the desk position by guide pins and a crank guide.

German Patent Reference DE 41 21 660 A1 shows a folding table with a table top which can be folded out and which is pivotally and displaceably held in lateral frame sections with its inner end. The table top is hinged on pivotal strips and can be brought into a horizontal position by displacing and rotating its end.

SUMMARY OF THE INVENTION

It is one object of this invention to attach a work surface of the type mentioned at the outset in such a way that, after two vertical sides are brought into a work position above the work surface, the two vertical sides are free and permit unhampered work thereon.

In accordance with this invention this object is attained because the horizontal side of the work surface which is on top in the stowed position is guided, vertically adjustable, by means of hinge bolts in insertion grooves fixed in the wall element or door. The lower ends of the guide grooves make a transition via transition sections pointing away from the wall element or the door into upward pointing holding receptacles for the hinge bolts. The vertical sides of the work surface are hingedly supported by means of respectively a guide rod on the wall element or on the door, wherein the hinge points at the work surface are arranged below the hinge bolts, and the hinge points at the wall element or the door are arranged below the holding receptacles of the guide grooves and are laid out with the size of the guide rods in such a way that, when the hinge bolts are inserted into the holding receptacles, the work surface takes up the desired work position with respect to the wall element or to the door.

To place the work surface into the work position, it is grasped at the lower horizontal side and lifted. In the process the slide bolts slide downward in the guide grooves. Shortly before reaching the work position, the work surface is slightly moved away from the wall element or the door in the transition sections, guiding the hinge bolts into the holding receptacles of the guide grooves under its own weight and in this way is fixed in the work position. If the work surface is returned again into the stowed position parallel with the wall element or the door, the free, projecting side of the work surface is slightly lifted, whereupon the hinge bolts leave the holding receptacles of the guide grooves. By a slight displacement of the work surface in the direction toward the wall element or the door, the transition sections are overcome and the hinge bolts reach the vertical areas of the guide grooves. If the work surface is released, driven by its own weight it moves into a stowed position, which is reached at a time when the hinge bolts rest against the upper ends of the guide grooves.

In the work position the guide rods always are located under the top of the work surface and no longer hamper work on it in any way. The change from the stowed position into the work position and vice versa can be performed by simple manipulation.

If in one embodiment the hinge bolts and the hinge points are arranged on a bent-off edge of the work surface, wherein the edge in the parallel stowed position is oriented toward the wall element or the door, the work surface not only has a sufficient rigidity, but the edge also simplifies the attachment of the hinge bolts and the guide rods. In this case it is preferably provided that the edge extends over all four sides of the rectangularly-shaped work surface.

For guiding the hinge bolts of the work surface when the position is changed, the guide groove, the transition section and the holding receptacle are introduced into a lateral leg of a fastening strip extending vertically with respect to the wall element or the door. Here, guidance can be simply achieved and improved because the hinge bolts on the work surface are formed by screws with screw heads which are screwed through the guide grooves into the edge of the work surface, wherein the screw head is larger in diameter than the width of the guide grooves.

In accordance with one embodiment the fastening of the fastening strip on the wall element or the door is accomplished in a simple way because the fastening strip is formed in a U-shape and rests with its center leg against the wall element or the door, and that suspension brackets, with which the fastening strip is screwed to a reinforcement frame connected with the wall element or the door, are bent out of the lateral leg of the fastening strip facing away from the work surface.

So that the guide rods do not hamper the setting of the work and stowed positions of the work surface, in one embodiment the guide rods are hinged to the sides, which face away from the work surface, of the lateral legs of the fastening strips that have the guide grooves, and the guide rods are hinged via spacer elements to the work surface, so that, in the stowed position, the guide rods lie on sides facing away from the work surface of the lateral legs of the fastening strips that have the guide grooves, and the lateral legs have recesses for receiving the spacer elements of the hinge points fixed in place on the work surface.

A preferred exemplary embodiment provides, that in the work position it extends perpendicularly with respect to the wall element or the door.

If the layout is such that the guide grooves have increasing distance from the wall element or the door in the direction toward the upper ends, so that in the stowed position there is space for the edge of the work surface, then the work surface can then come very close to the wall element of the door in the work position.

BRIEF DESCRIPTION OF THE DRAWINGS

This invention will be explained in more detail by an exemplary embodiment represented in the drawings wherein.

DESCRIPTION OF PREFERRED EMBODIMENTS

Figure 1:
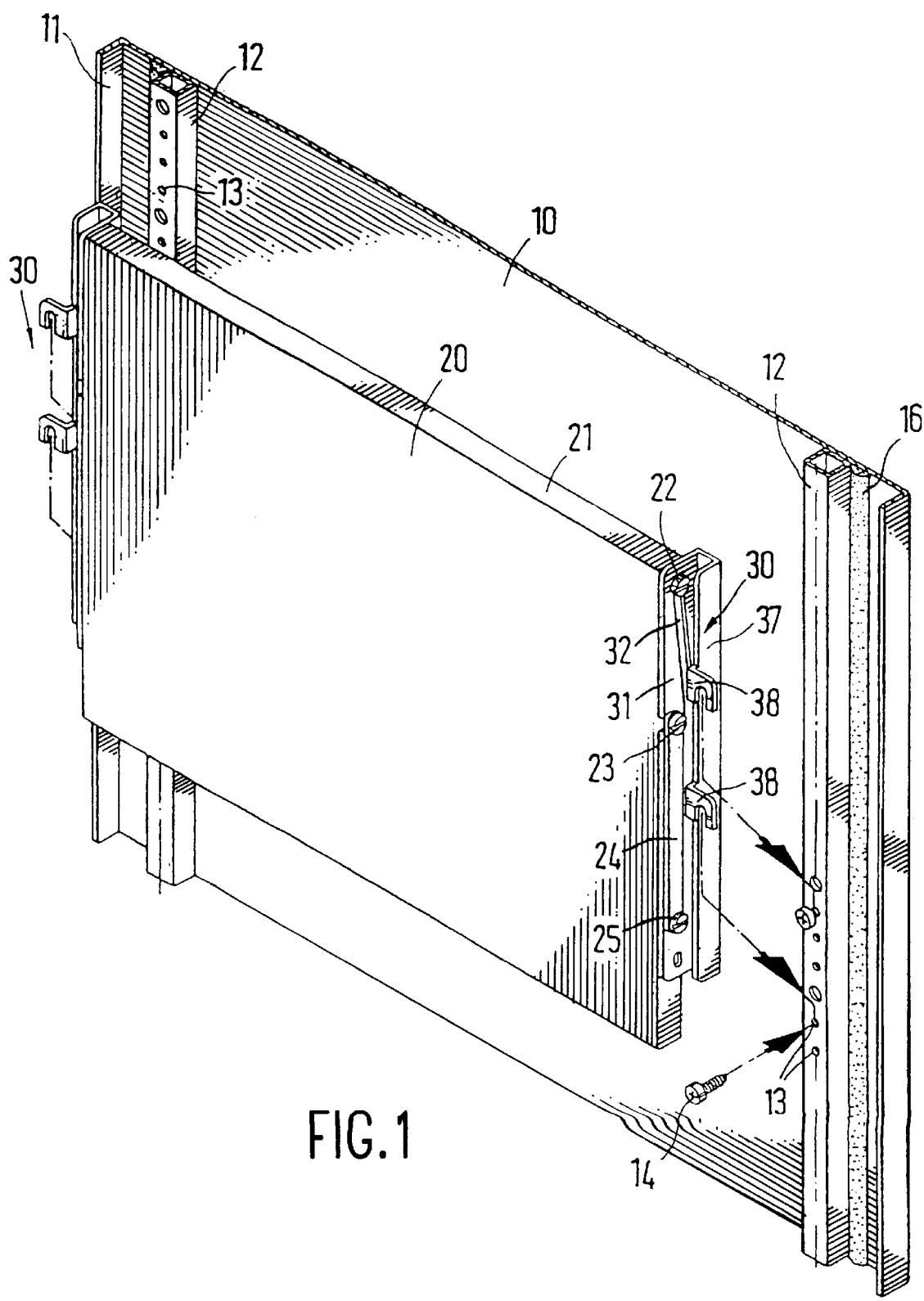
FIG. 1 a perspective view of a work surface in a stowed position, being attached to an inside of a door of a switchgear cabinet.

A view of the inside of the door 10 of a switchgear cabinet is shown in FIG. 1, wherein only the area to which a work surface 20 is attached is shown. The door 10 is reinforced by an edge 11, bent toward the interior, which can extend over all four sides. A reinforcement frame is attached to the inside of the door 10, portions of the vertical legs 12 of which are shown. The legs 12 have fastening bores 13. A sealing element 16 is arranged between the edge 11 and the reinforcement frame, which seals the door 10 when closing the associated open side of the switchgear cabinet.

The work surface 20, shown in the stowed position, is connected on both vertical sides with respectively one fastening strip 30. The fastening strips 30 are U-shaped, wherein the lateral leg 37 facing away from the work surface has bentaway suspension hooks 38. The distance between the two suspension hooks 38 is matched to the divisions of the fastening bores 13 in the legs 12 of the reinforcement frame. If screws 14 are screwed into the assigned fastening bores 13, the unit comprising the work surface 20, the guide rods 24 and the fastening strips 30 can be suspended from the screws 14 and, by tightening the fastening screws 14, the unit can be fastened on them. In this case the exterior dimensions of the unit are matched to the distance between the vertical legs 12 of the reinforcement frame.

Figure 2:
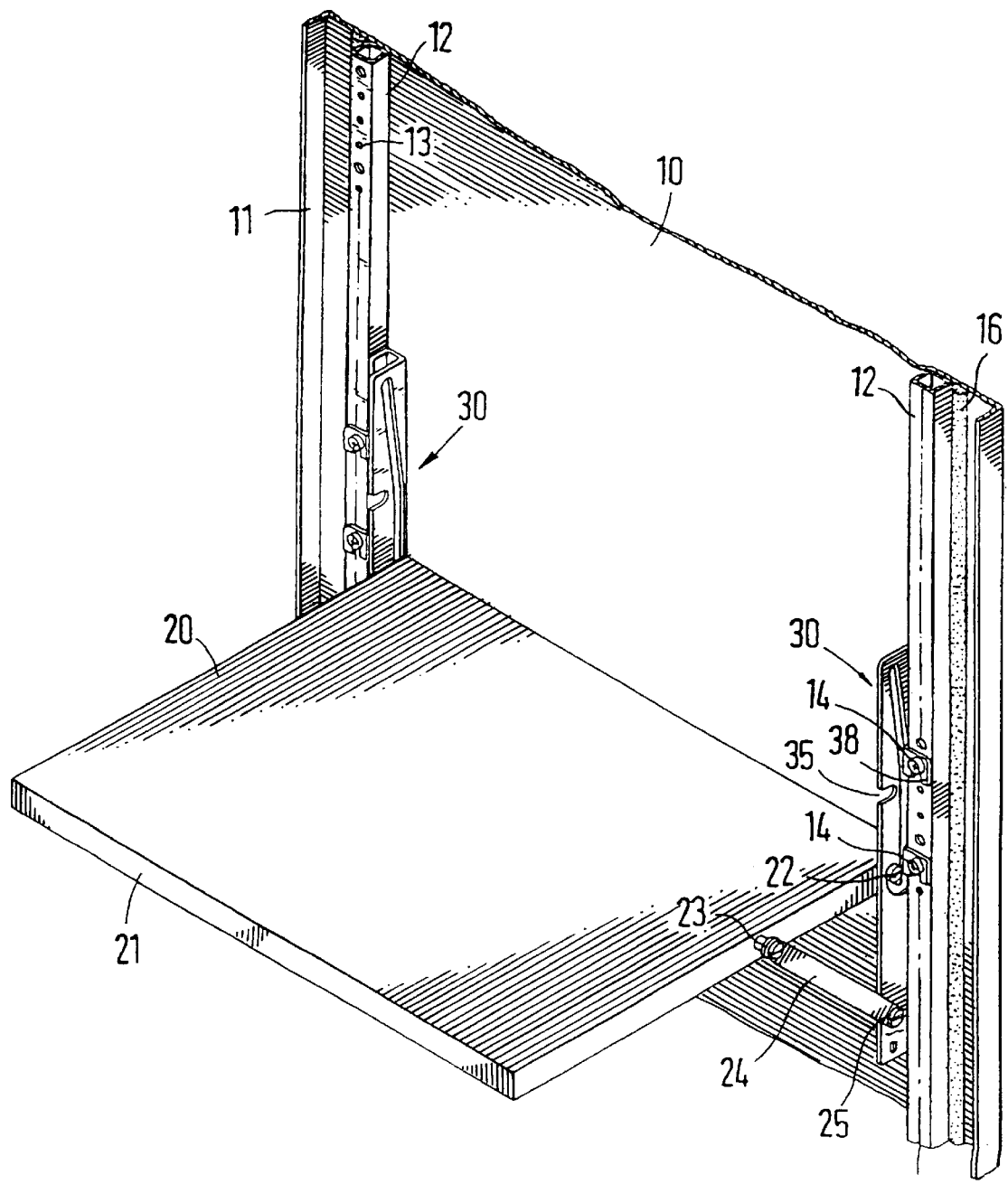
FIG. 2 is a perspective view of the work surface attached to the door and placed in the work position.
Figure 3:
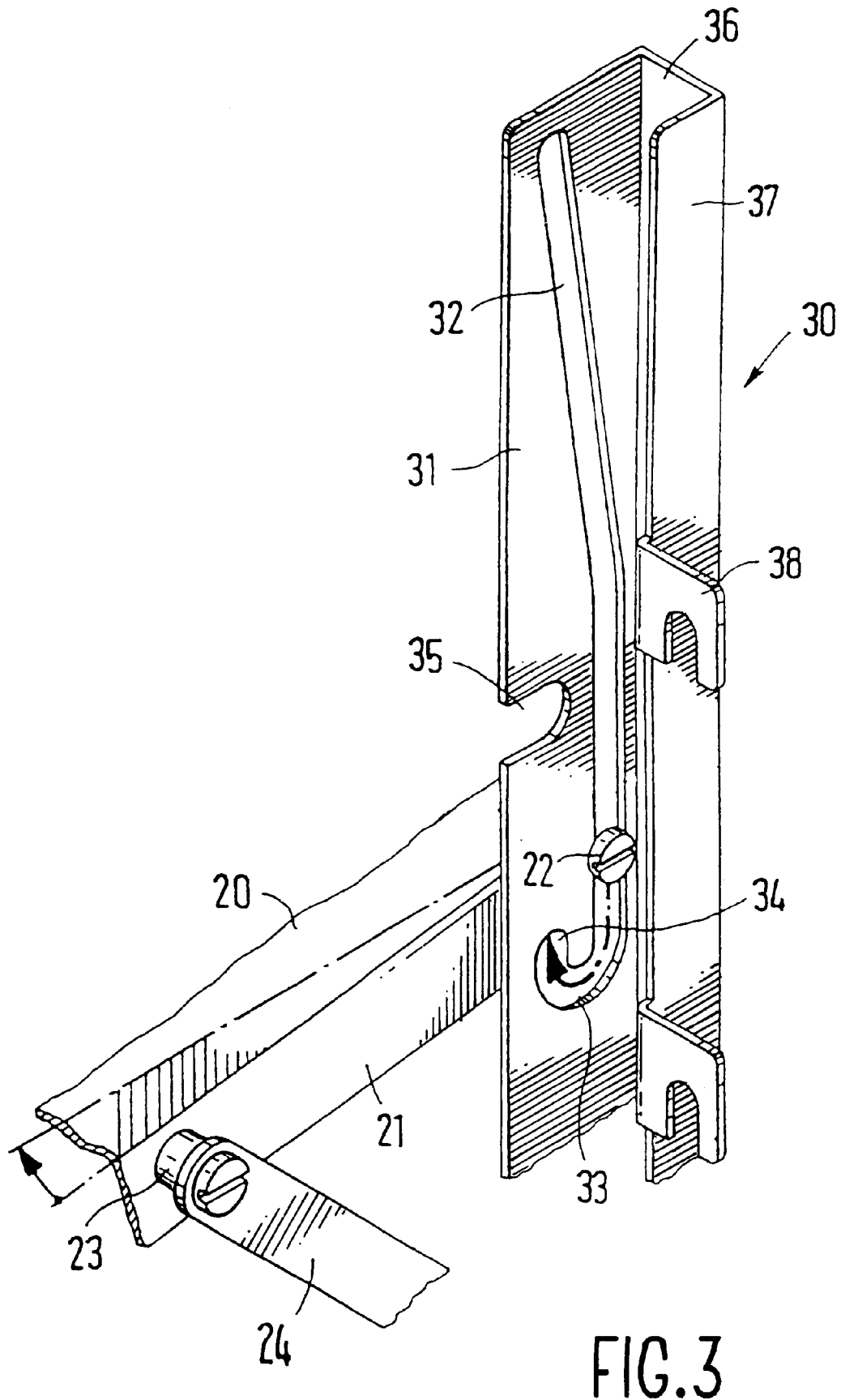
FIG. 3 is an enlarged perspective partial view of a fastening plate with the element in which the hinge bolt of the work surface is guided.

As shown in FIGS. 2 and 3, two hinge bolts 22 are inserted into the lateral edge 21 in the area of the upper, horizontal side of the work surface 20, which are designed as screws with screw heads and which are screwed into the edge 21. The screw head has a diameter which is greater than the width of the guide grooves 32 cut into the lateral leg 31 of the fastening strip 30 facing the work surface 20. In the process, the screws are passed through the guide grooves 32 and screwed together with the edge 21. A guide rod 24 is provided on each side of the work surface 20, which is hingedly attached to the work surface 20 on the one side at the hinge point 23, and on the other side at the hinge point 25 of the fastening strip 30. Here, the hinge point 25 is placed on the lateral leg 31 facing away from the work surface 20. The hinge point 23 on the work surface 20 includes a spacer element, so that in the stowed position the guide rod 24 also rests on the side of the lateral leg 31 facing away from the work surface 20. Here the lateral leg 31 has a recess 35, open toward the front, for receiving the spacer element of the hinge point 23.

It should be noted that on the left side of the work surface 20, which is not shown in detail, the fastening strip 30 is embodied in a mirror-reversed manner, while the guide rod 24 is hinged on the fastening strip 30 and the work surface 20 in the same relation.

The guide grooves 32 in the lateral legs 31 of the fastening strips 30 receive the hinge bolts 22 of the work surface 20, so that the work surface 20 is guided in a vertically displaceable manner. The lower ends of the guide grooves 32 transition via transition sections 33 into holding receptacles 34 for the hinge bolts 22. The transition section 33 leads away from the door 10, and the holding receptacles 34 extend further upward, so that the holding receptacles 34 can receive and hold the hinge bolts 22, when in the work position the work surface 20 is pivotably stressed by its own weight around the axis formed by the hinge points 23 and in this way is held in the holding receptacles 34. The essential portion of the guide grooves 32 extends vertically at a small distance from the door 10. Only in the area of the upper ends is the distance of the guide grooves 32 to the door 10 increased, so that in the stowed position there is sufficient space for the edge 21 of the work surface 20 oriented toward the door 10.

The hinge points 23 on the work surface 20 are located below the hinge bolts 22, and the hinge points 25 of the guide rods 24 at the fastening strips 30 are located lower than the holding receptacles 34. It is possible to fix the inclination of the work surface 20 in the work position by means of the dimensions of the guide rods 24 and the position of the hinge points 23 and 25, wherein preferably a position perpendicularly with respect to the door 10 is favored. However, the work surface 20 can also be in the work position slightly inclined downward toward the front.

As FIG. 2 shows, in the work position the guide rods 24 are located below a work side of the work surface 20 and do not hamper in any way working on the work surface 20, so that objects extending past both sides can be placed on the work surface 20.

If the work surface 20 is displaced from the stowed position in accordance with FIG. 1 into the work position in accordance with FIG. 2, the work surface 20 is grasped at the upper horizontal side and pivoted upward. In the process, the hinge bolts 22 slide downward in the guide grooves 32 until the hinge bolts 22 reach the transition sections 33. The work surface 20 is pulled forward and released. The work surface 20 slightly pivots upward under its own weight, because the hinge bolts 22 are inserted into the holding receptacles 34. The work position of the work surface 20 is fixed, it is not changed even when a load is placed on the work surface 20.

If the work surface 20 is again brought out of the work position in accordance with FIG. 2 into the stowed position in accordance with FIG. 1, the free side of the work surface 20 is slightly lifted. In the process the hinge bolts 22 are moved out of the holding-receptacles 34. By displacing the work surface 20 in the direction toward the door 10, the hinge bolts 22 are brought via the transition sections 33 into the area of the vertically arranged areas of the guide grooves 32. If the work surface 20 is pushed downward at the front, it automatically returns into the stowed position because of its own weight when the hinge bolts 22 are run in, which position is reached when the hinge bolts 22 rest against the upper ends of the guide grooves 32.

I claim:

1. In a work surface attached to a wall element or a door of a switchgear cabinet, which is moveable between a parallel stowed position and a flipped-down work position, the improvement comprising:

a horizontal side of the work surface (20) which is on top in the stowed position guided, vertically adjustable, by a plurality of hinge bolts (22) in guide grooves (32) fixed in the wall element or door, a plurality of lower ends of the guide grooves (32) transitioning via transition sections (33) pointing away from the wall element or the door (10) into upward pointing holding receptacles (34) for the hinge bolts (22), and a plurality of vertical sides of the work surface (20) hingedly supported by respectively a guide rod (24) on the wall element or the door (10), the guide rods (24) hinged to vertical sides, which face away from the work surface (20), of a plurality of lateral legs (31) of a plurality of fastening strips (30) having the guide grooves (32), wherein a plurality of first hinge points (23) at the work surface (20) are arranged below the hinge bolts (22), and a plurality of second hinge points (25) at the wall element or the door (10) are arranged below the holding receptacles (34) of the guide grooves (32), a size of the guide rods (24) being such that, when the hinge bolts (22) are inserted into the holding receptacles (34), the work surface (20) takes up the desired work position with respect to the wall element or the door (10).

2. In the work surface in accordance with claim 1, wherein the hinge bolts (22) and the hinge points (23) are arranged on a bent-off edge (21) of the work surface (20), wherein the edge (21) in the parallel stowed position is oriented toward the wall element or the door (10).

3. In the work surface in accordance with claim 2, wherein the edge (21) extends over four sides of the rectangularly-shaped work surface (20).

4. In the work surface in accordance with claim 3, wherein the guide grooves (32), the transition sections (33) and the holding receptacles (34) are introduced into a lateral leg (31) of a fastening strip (30) extending perpendicularly with respect to the wall element or the door (10).

5. In the work surface in accordance with claim 4, wherein the hinge bolts (22) on the work surface (20) are formed by screws with screw heads which are screwed through the guide grooves (32) into the edge (21) of the work surface (20), wherein each of the screw heads is larger in diameter than a width of each of the guide grooves (32).

6. In a work surface attached to a wall element or a door of a switchgear cabinet, which is moveable between a parallel stowed position and a flipped-down work position, the improvement comprising:

a horizontal side of the work surface (20) which is on top in the stowed position guided, vertically adjustable, by a plurality of hinge bolts (22) in guide grooves (32) fixed in the wall element or door, a plurality of lower ends of the guide grooves (32) transitioning via transition sections (33) pointing away from the wall element or the door (10) into upward pointing holding receptacles (34) for the hinge bolts (22), a plurality of vertical sides of the work surface (20) hingedly supported by respectively a guide rod (24) on the wall element or the door (10), a plurality of first hinge points (23) at the work surface (20) arranged below the hinge bolts (22), and a plurality of second hinge points (25) at the wall element or the door (10) are arranged below the holding receptacles (34) of the guide grooves (32), a size of the guide rods (24) being such that, when the hinge bolts (22) are inserted into the holding receptacles (34), the work surface (20) takes up the desired work position with respect to the wall element or the door (10), the hinge bolts (22) and the hinge points (23) arranged on a bent-off edge (21) of the work surface (20), the edge (21) in the parallel stowed position oriented toward the wall element or the door (10), the edge (21) extending over four sides of the rectangularly-shaped work surface (20), the guide grooves (32), the transition sections (33) and the holding receptacles (34) introduced into a lateral leg (31) of a fastening strip (30) extending perpendicularly with respect to the wall element or the door (10), the hinge bolts (22) on the work surface (20) formed by screws with screw heads which are screwed through the guide grooves (32) into the edge (21) of the work surface (20), each of the screw heads being larger in diameter than a width of each of the guide grooves (32), and the fastening strip (30) embodied in a U-shape and resting with a center leg (36) against the wall element or the door (10), and a plurality of suspension brackets (38) with which the fastening strip (30) is screwed to a reinforcement frame (12) connected with the wall element or the door (10) bent out on a lateral leg (37) of the fastening strip (30) facing away from the work surface (20).

7. In the work surface in accordance with claim 6, wherein the guide rods (24) are hinged to sides, which face away from the work surface (20), of the lateral legs (31) of the fastening strips (30) having the guide grooves (32).

8. In the work surface in accordance with claim 7, wherein the guide rods (24) are hinged via spacer elements to the work surface (20), so that in the stowed position, the guide rods (24) lie on sides facing away from the work surface (20) of the lateral legs (31) of the fastening strips (30) having the guide grooves (32), and the lateral legs (31) have recesses (35) for receiving the spacer elements of the hinge points (23) fixed on the work surface (20).

9. In the work surface in accordance with claim 8, wherein in the work position the work surface (20) extends perpendicularly with respect to the wall element or the door (10).

10. In the work surface in accordance with claim 9, wherein the guide grooves (32) have an increasing distance from the wall element or the door (10) in a direction toward upper ends, so that in the stowed position there is space for the edge (21) of the work surface (20).

11. In the work surface in accordance with claim 1, wherein the guide grooves (32), the transition sections (33) and the holding receptacles (34) are introduced into a lateral leg (31) of a fastening strip (30) extending perpendicularly with respect to the wall element or the door (10).

12. In the work surface in accordance with claim 1, wherein the hinge bolts (22) on the work surface (20) are formed by screws with screw heads which are screwed through the guide grooves (32) into an edge (21) of the work surface (20), wherein each of the screw heads is larger in diameter than a width of each of the guide grooves (32).

13. In the work surface in accordance with claim 1, wherein a fastening strip (30) is embodied in a U-shape and rests with a center leg (36) against the wall element or the door (10), and a plurality of suspension brackets (38) with which the fastening strip (30) is screwed to a reinforcement frame (12) connected with the wall element or the door (10)

are bent out on a lateral leg (37) of the fastening strip (30) facing away from the work surface (20).

14. In the work surface in accordance with claim 1, wherein the guide rods (24) are hinged via spacer elements to the work surface (20), so that in the stowed position, the guide rods (24) lie on sides facing away from the work surface (20) of a plurality of lateral legs (31) of a plurality of fastening strips (30) having the guide grooves (32), and the lateral legs (31) have recesses (35) for receiving the spacer elements of the hinge points (23) fixed on the work surface (20).

15. In the work surface in accordance with claim 1, wherein in the work position the work surface (20) extends perpendicularly with respect to the wall element or the door (10).

16. In the work surface in accordance with claim 1, wherein the guide grooves (32) have an increasing distance from the wall element or the door (10) in a direction toward upper ends, so that in the stowed position there is space for an edge (21) of the work surface (20).

* * * * *